(12) United States Patent
Miyamoto

(10) Patent No.: US 11,954,364 B2
(45) Date of Patent: Apr. 9, 2024

(54) MEMORY SYSTEM AND METHOD OF WRITING DATA TO STORAGE AREAS CONSTITUTING GROUP

(71) Applicant: Kioxia Corporation, Tokyo (JP)

(72) Inventor: Hironobu Miyamoto, Yokohama Kanagawa (JP)

(73) Assignee: Kioxia Corporation, Tokyo (JP)

( * ) Notice: Subject to any disclaimer, the term of this patent is extended or adjusted under 35 U.S.C. 154(b) by 101 days.

(21) Appl. No.: 17/689,907

(22) Filed: Mar. 8, 2022

(65) Prior Publication Data

US 2023/0089022 A1    Mar. 23, 2023

(30) Foreign Application Priority Data

Sep. 17, 2021   (JP) .................................. 2021-152579

(51) Int. Cl.
*G06F 3/06* (2006.01)

(52) U.S. Cl.
CPC .......... *G06F 3/0659* (2013.01); *G06F 3/0604* (2013.01); *G06F 3/0613* (2013.01); *G06F 3/0634* (2013.01); *G06F 3/0679* (2013.01)

(58) Field of Classification Search
CPC .... G06F 3/0604; G06F 3/0613; G06F 3/0625; G06F 3/0634; G06F 3/064; G06F 3/0644; G06F 3/0659; G06F 3/0679; Y02D 10/00
See application file for complete search history.

(56) References Cited

U.S. PATENT DOCUMENTS

| | | | |
|---|---|---|---|
| 8,832,507 B2 | 9/2014 | Post et al. | |
| 2010/0228940 A1 | 9/2010 | Asnaashari et al. | |
| 2012/0124304 A1 | 5/2012 | Asnaashari et al. | |
| 2020/0133838 A1 | 4/2020 | Park | |
| 2021/0011646 A1* | 1/2021 | Nystad | G06F 3/064 |
| 2021/0132827 A1* | 5/2021 | Helmick | G06F 3/0629 |
| 2022/0300212 A1* | 9/2022 | Shin | G06F 3/0652 |

FOREIGN PATENT DOCUMENTS

JP    2012-519900 A    8/2012

* cited by examiner

*Primary Examiner* — Aracelis Ruiz
(74) *Attorney, Agent, or Firm* — Allen & Overy LLP

(57) ABSTRACT

According to an embodiment, a memory system includes memory chips operable in parallel and a memory controller. The memory chips each include first storage areas. The memory controller generates first groups each including first storage areas selected from different memory chips. The memory controller generates second groups each being constituted by a minimum number of first storage areas composed by excluding one or more first storage areas from each of the first groups. The minimum number of first storage areas are capable of storing at least a first amount of data received from the host. The memory controller executes writing of the data to all the minimum number of first storage areas constituting one second group.

20 Claims, 15 Drawing Sheets

| | BANK #0 | BANK #1 | ... |
|---|---|---|---|
| ch.0 | FIRST BU LIST, SECOND BU LIST, AND THIRD BU LIST | FIRST BU LIST, SECOND BU LIST, AND THIRD BU LIST | ... |
| ch.1 | FIRST BU LIST, SECOND BU LIST, AND THIRD BU LIST | FIRST BU LIST, SECOND BU LIST, AND THIRD BU LIST | ... |
| ⋮ | ⋮ | ⋮ | ... |

202

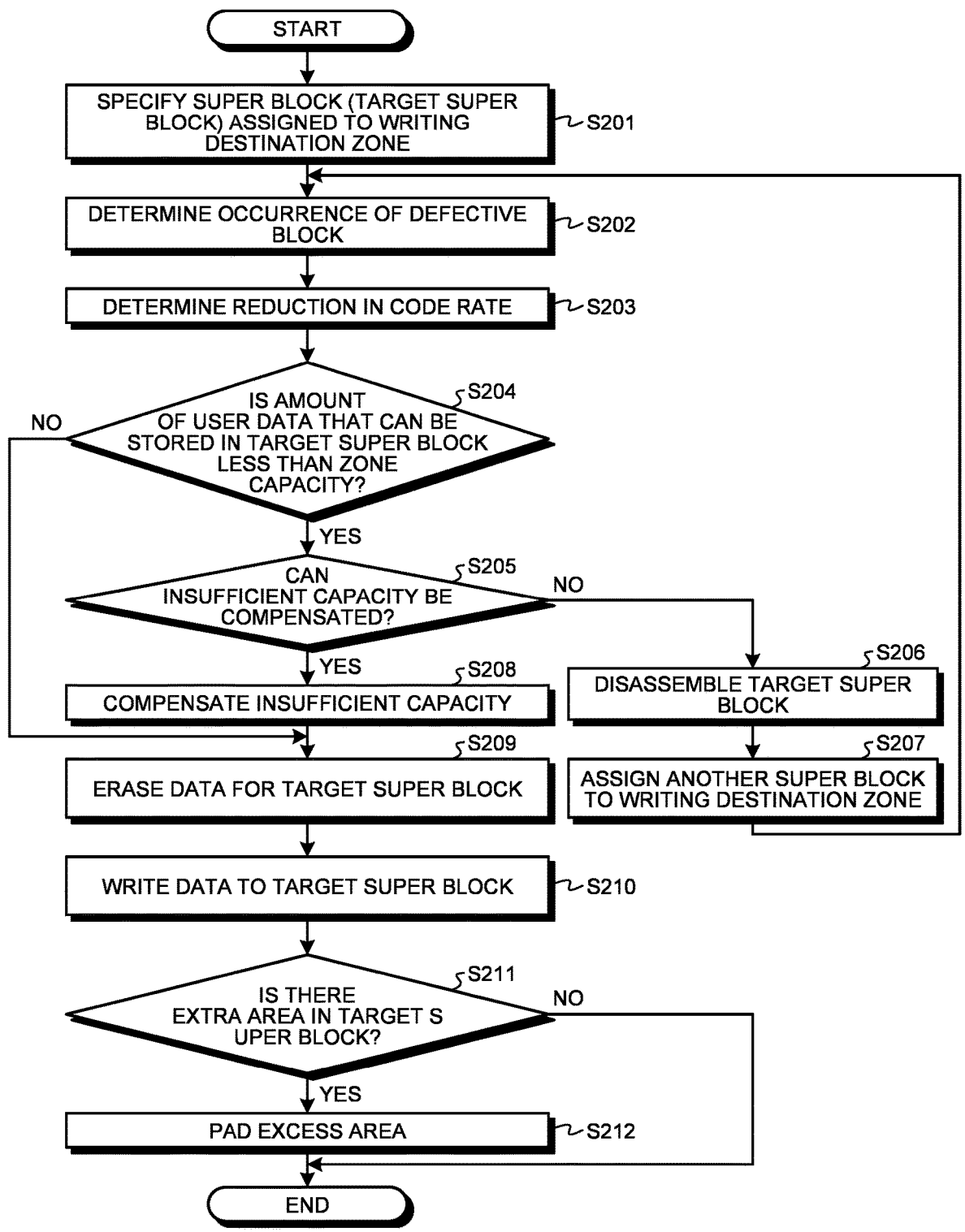

MEMORY SYSTEM AND METHOD OF WRITING DATA TO STORAGE AREAS CONSTITUTING GROUP

CROSS-REFERENCE TO RELATED APPLICATIONS

This application is based upon and claims the benefit of priority from Japanese Patent Application No. 2021-152579, filed on Sep. 17, 2021; the entire contents of which are incorporated herein by reference.

FIELD

Embodiments described herein relate generally to a memory system and a method.

BACKGROUND

In recent years, a type of solid state drive (SSD) referred to as a zoned namespace (ZNS) SSD has been proposed. The ZNS SSD provides one or more units of a storage area to the host. Such a storage area unit may be referred to as a zone. The host can write data to each zone up to a specified capacity that is common to all zones.

In the ZNS SSD, a memory controller assigns a group of a plurality of physical blocks to each zone. The group of a plurality of physical blocks assigned to each zone is referred to as a super block. Upon receiving data from the host along with a request for writing to one storage area (that is, a zone), the memory controller writes the received data to a super block assigned to the requested zone.

BRIEF DESCRIPTION OF THE DRAWINGS

FIG. 13 is a flowchart for describing an example of an operation of writing to a super block of the memory system according to the embodiment.

DETAILED DESCRIPTION

According to the present embodiment, a memory system is connectable to a host. The memory system includes a plurality of memory chips operable in parallel and a memory controller. Each memory chip of the plurality of memory chips includes a plurality of first storage areas. The memory controller generates a plurality of first groups including first storage areas selected from different memory chips among the plurality of memory chips. The memory controller generates a plurality of second groups, each second group of the plurality of the second group being constituted by a minimum number of first storage areas composed by excluding one or more first storage areas from each first group of the plurality of first groups. The minimum number of first storage areas are capable of storing at least a first amount of data received from the host. The memory controller executes writing of the data to all the minimum number of first storage areas constituting one second group.

Hereinafter, a memory system and a method according to embodiments will be described in detail with reference to the accompanying drawings. Note that the present invention is not limited by this embodiment.

Embodiment

Figure 1:
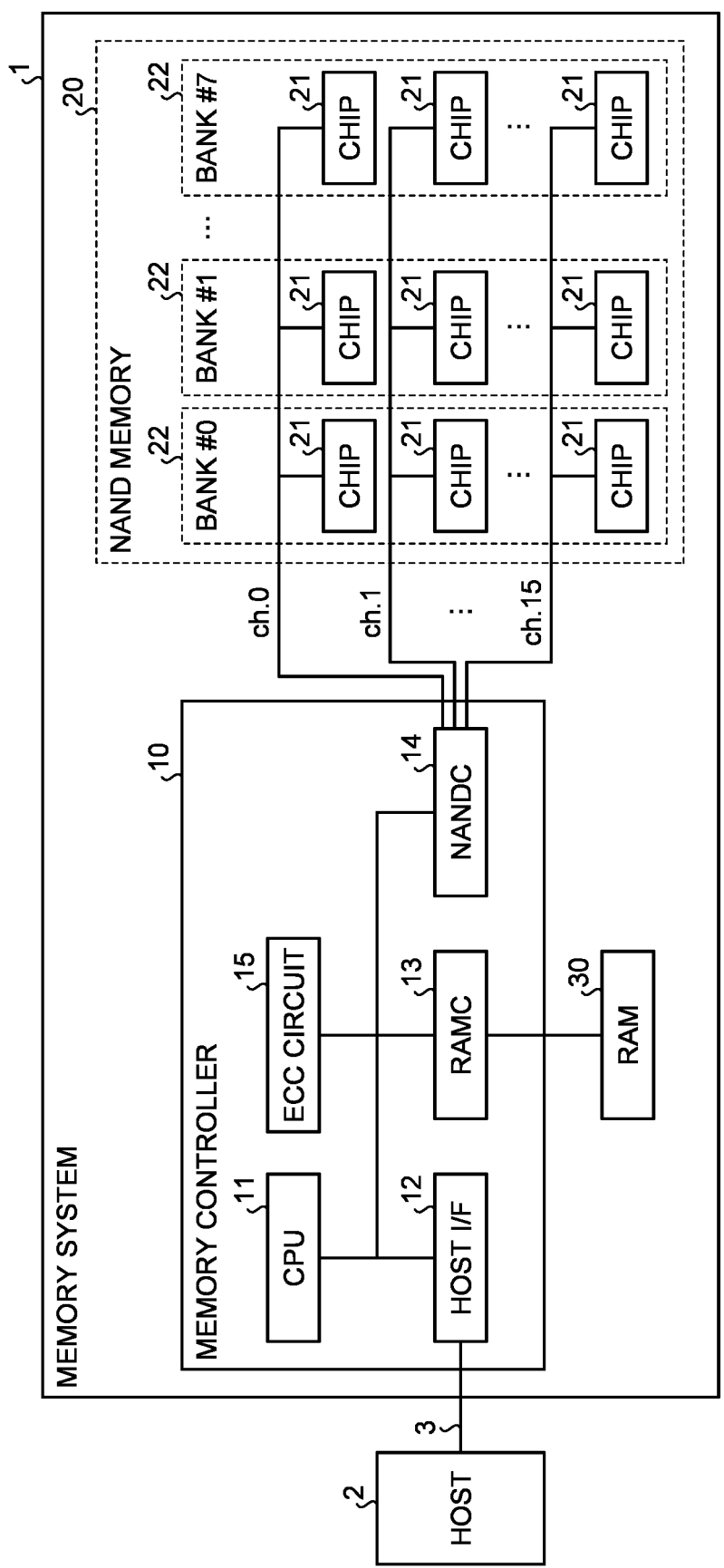
FIG. 1 is a diagram illustrating a configuration example of a memory system according to an embodiment.

FIG. 1 is a diagram illustrating a configuration example of a memory system according to an embodiment.

A memory system 1 according to the embodiment can be connected to a host 2 via a communication path 3. The host 2 is a computer. The computer includes, for example, a personal computer, a portable computer, a server, or a portable communication device. The memory system 1 functions as an external storage device of the host 2.

The memory system 1 is an SSD of a type referred to as a ZNS SSD. The ZNS SSD is an SSD capable of executing each command included in a ZNS command set specified by NVM Express (TM). The ZNS command set includes, for example, a zone create command. The zone create command is a command for causing the memory system 1 to set a new zone. The memory system 1 as the ZNS SSD provides to the host 2 one or more zones instructed by the zone create command. The zone is a logical storage area where the host 2 is allowed to write data of a given unit. A capacity capable of storing data from the host 2 is common to the zones. A capacity capable of storing data from the host 2 per one zone is referred to as a zone capacity. Hereinafter, data transferred from the host 2 to the memory system 1 will be referred to as user data.

In the ZNS SSD, there is a constraint that the host 2 has to sequentially write user data in terms of a logical address for each zone. Additionally, in the ZNS SSD, there is a constraint that all data stored in one zone is erased collectively.

The memory system 1 includes a memory controller 10, a NAND flash memory (NAND memory) 20, and a random access memory (RAM) 30. The NAND memory 20 is a nonvolatile memory used as a storage. Note that the type of the nonvolatile memory used as a storage is not limited to the NAND flash memory. For example, a NOR flash memory or the like can be employed as a storage.

The RAM 30 is a volatile memory that stores various types of information for the memory controller 10 to control the NAND memory 20. Details of various types of information stored in the RAM 30 will be described later. In addition, the RAM 30 may be used by the memory controller 10 as a buffer for data transfer between the host 2 and the NAND memory 20. In addition, the RAM 30 may also be used as a buffer in which a firmware program is loaded. Note that any type of memory can be applied as the RAM 30. For example, a dynamic random access memory (DRAM), a static random access memory (SRAM), or a combination of these can be applied as the RAM 30. In addition, instead of the RAM 30, a volatile or nonvolatile memory faster than a storage can be applied. The RAM 30 may be built in the memory controller 10.

The memory controller 10 includes a central processing unit (CPU) 11, a host interface (host I/F) 12, a RAM controller (RAMC) 13, a NAND controller (NANDC) 14, and an error correction checking (ECC) circuit 15. The CPU 11, the host I/F 12, the RAMC 13, the NANDC 14, and the ECC circuit 15 are electrically connected through a bus.

The memory controller 10 may be configured as a system-on-a-chip (SoC). Alternatively, the memory controller 10 may include a plurality of chips. The memory controller 10 may be configured as one SoC including the RAM 30.

The host I/F 12 controls a signal transferred via the communication path 3. The host I/F 12 receives various commands from the host 2. The host I/F 12 executes, for example, data transfer between the host 2 and the RAM 30. The RAMC 13 controls the RAM 30. The NANDC 14 controls the NAND memory 20. The NANDC 14 executes data transfer between the RAM 30 and the NAND memory 20, for example.

The CPU 11 is a processor that executes control of the entire memory controller 10. The CPU 11 executes the control based on a firmware program.

Part of or all the control executed by the CPU 11 as a processor may be executed by a hardware circuit. Part of or all the control executed by the CPU 11 as a processor may be executed by a field-programmable gate array (FPGA) or an application specific integrated circuit (ASIC).

The ECC circuit 15 performs encoding for error correction on data to be written to the NAND memory 20, and performs decoding on data read from the NAND memory 20. That is, the ECC circuit 15 is a circuit that executes processing related to error correction of data.

As an encoding system for the ECC circuit 15, an encoding system whose code rate is variable is adopted. The code rate is numerical information obtained by dividing the size of the data before encoding by the size of the data after encoding. The smaller the code rate, the larger the amount of redundant data included in the encoded data. Therefore, the lower the code rate, the higher the error correction capability.

As the number of writing/erasing cycles executed on the NAND memory 20 increases, error bits included in data stored in the NAND memory 20 are likely to occur. That is, the reliability of the stored data decreases as the number of writing/erasing cycles increases. When the number of error bits included in the data exceeds the number correctable by the ECC circuit 15, the data cannot be read correctly. The CPU 11 reduces the code rate before it becomes impossible to correctly read data, preventing it from becoming impossible to correctly read data.

A trigger for reducing the code rate is arbitrary. For example, the CPU 11 may reduce the code rate in accordance with the number of writing/erasing cycles with respect to the NAND memory 20. Alternatively, the memory controller 10 may include an error correction function or circuit that is executed when the error correction by the ECC circuit 15 fails and has a higher error correction capability than the ECC circuit 15, and the CPU 11 may reduce the code rate in accordance with the use of the error correction function or the circuit.

Note that the reduction of the code rate is performed in a certain unit of the storage area. In the embodiment, the unit of reducing the code rate is a block unit BU. Although details of the block unit BU will be described later, the NAND memory 20 includes a plurality of block units BU. The CPU 11 manages the code rate for each block unit BU. Then, when the memory controller 10 writes the user data to the NAND memory 20, the CPU 11 causes the ECC circuit 15 to encode the user data at the code rate related to the block unit BU of the writing destination.

There are an upper limit value and a lower limit value with respect to the code rate. For example, in a case where the memory system 1 is used for the first time after shipment, the CPU 11 causes the ECC circuit 15 to execute encoding at the code rate of the upper limit value. Then, the CPU 11 reduces the code rate stepwise for each block unit BU in accordance with a decrease in reliability of stored data. Then, when the code rate of some block unit BU is reduced to the lower limit value and the reliability of the stored data therein does not satisfy the requirement even at the code rate of the lower limit value, the CPU 11 prohibits the use of the block unit BU. The block unit BU prohibited from being used is referred to as a defective block.

Note that the defective block does not always occur due to the reduction of the code rate. The block unit BU determined to have failed is also set as a defective block.

The NAND memory 20 includes a plurality of memory chips 21. In FIG. 1, the memory chips 21 are each simply referred to as a chip 21 in order to avoid complication of the drawing.

Figure 2:
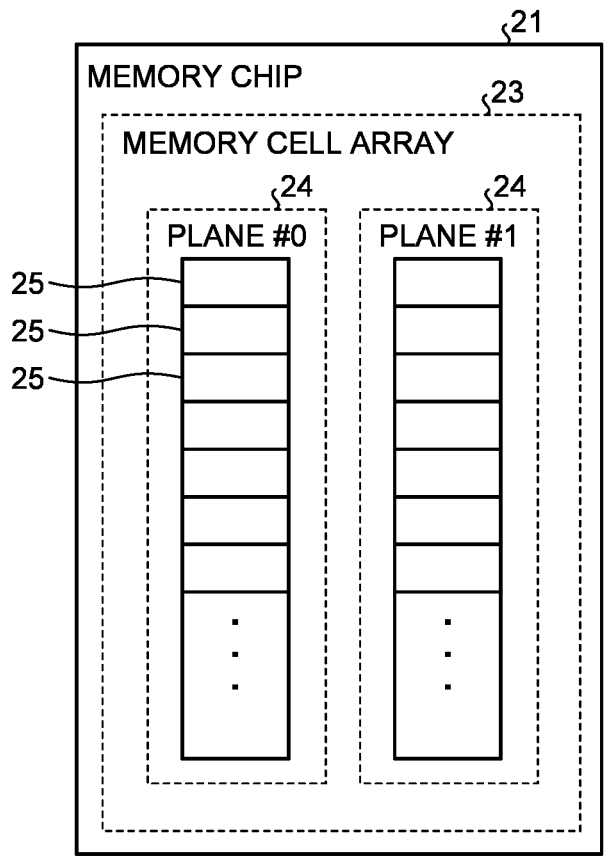
FIG. 2 is a schematic diagram illustrating an example of a configuration of each memory chip according to the embodiment.

FIG. 2 is a schematic diagram illustrating an example of a configuration of each memory chip 21 according to the embodiment. Each memory chip 21 includes a memory cell array 23. The memory cell array 23 has a configuration in which multiple memory cells are two-dimensionally or three-dimensionally arranged. The memory cell array 23 is divided into two areas 24. Each area 24 includes a plurality of physical blocks 25. Each area 24 is also referred to as a plane.

The memory chip 21 includes peripheral circuitry (for example, a row decoder, a column decoder, a page buffer, a data cache, and the like) independent for each area 24. Therefore, the memory chip 21 can simultaneously access the two areas 24. Examples of the access include writing, reading, and erasing.

A plane number is given to each of the two areas 24 of each memory chip 21. Specifically, one of the two areas 24 is a plane specified by the plane number 0, and the other of the two areas 24 is a plane specified by the plane number 1. Hereinafter, a plane #0 refers to the area 24 specified by the plane number 0, and a plane #1 refers to the area 24 specified by the plane number 1.

Note that the number of the areas 24 included in the memory cell array 23 may be one, or three or more.

Figure 3:
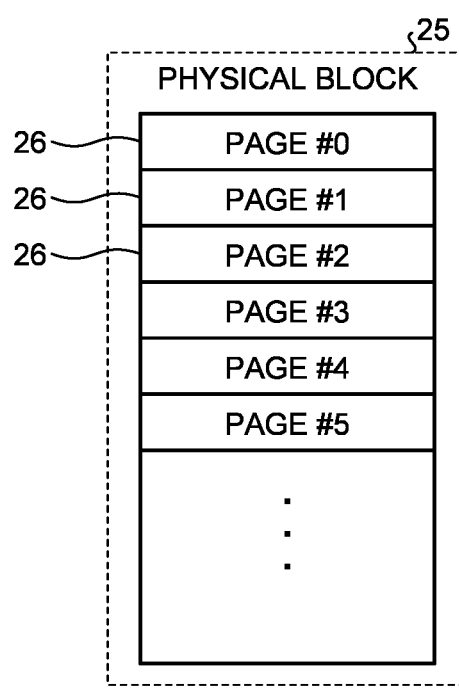
FIG. 3 is a diagram illustrating a configuration example of each physical block according to the embodiment.

The physical block 25 is a unit of erasing in each area 24. FIG. 3 is a diagram illustrating a configuration example of each physical block 25. Each physical block 25 includes a plurality of physical pages 26. The physical page 26 is a unit of writing and reading in each area 24. A page number is given to each physical page 26. In FIG. 3, six physical pages 26 to which page numbers 0 to 5 are given are referred to as pages #0 to #5, respectively.

As illustrated in FIG. 1, each of the memory chips 21 constituting the NAND memory 20 is connected to the memory controller 10 via any one of sixteen channels (ch. 0 to ch. 15). Here, it is assumed that eight memory chips 21 are connected to each channel ch.

Each memory chip 21 is connected to only any one of the sixteen channels ch. Each channel ch is constituted by a wiring group including an I/O signal line and a control signal line group, conforming to a given standard. The I/O signal line is a signal line for transferring data, an address, and a command. Note that the bit width of the I/O signal line is not limited to one bit. The control signal line group is a group of a signal line that transfers a write enable (WE) signal, a signal line that transfers a read enable (RE) signal, a signal line that transfers a command latch enable (CLE) signal, a signal line that transfers an address latch enable (ALE) signal, a signal line that transfers a write protect (WP) signal, and the like. The memory controller 10 can individually control each channel ch. The memory controller 10 can operate in parallel the memory chips 21 connected to different channels ch by simultaneously and individually controlling those channels ch.

In addition, a plurality of banks 22 is defined for the NAND memory 20. Each bank 22 includes 16 memory chips 21 connected to different channels ch. The eight memory chips 21 connected to one channel ch belong to different banks 22. Therefore, the NAND memory 20 includes eight banks 22 as the plurality of banks 22. Each bank 22 is given with a unique bank number (bank #0 to bank #7).

The memory controller 10 executes bank interleaving by using the plurality of banks 22. Bank interleaving is one of parallel operations. In the bank interleaving, while two or more (for example, sixteen) memory chips 21 belonging to one bank 22 are accessing data, the memory controller 10 issues an access instruction to two or more (for example, sixteen) memory chips 21 belonging to another bank 22. As a result, the total time required for data transfer between the NAND memory 20 and the memory controller 10 is shortened. Note that the access instruction includes a writing instruction, a reading instruction, and an erasing instruction.

In this manner, the memory controller 10 simultaneously operates the sixteen channels ch and executes the bank interleaving using the eight banks 22, in a manner that a total of 128 memory chips 21 can be operated in parallel.

Moreover, the memory controller 10 is able to simultaneously access two areas (that is, planes) 24 for each memory chip 21. Therefore, the memory controller 10 can write data in parallel to the physical blocks 25 included in the total of 256 areas 24. Each physical block 25 constituting the group of physical blocks 25 that can be written in parallel is sometimes referred to as a parallel writing element.

The memory controller 10 assigns a group of a plurality of physical blocks 25 to each zone. The group of a plurality of physical blocks 25 assigned to one zone is referred to as a super block. A method of assigning super block will be described below.

The super block is constituted by a group of parallel writing elements. The memory controller 10 generates a candidate for the configuration of the super block by using a group of parallel writing elements. Such a candidate for the configuration of the super block is referred to as a candidate configuration.

Note that, in the example illustrated in FIG. 1, the NAND memory 20 is connected to the controller 10 by sixteen channels ch, and eight banks 22 are defined for the NAND memory 20. The number of channels ch connecting the NAND memory 20 and the memory controller 10 is not limited to sixteen. In addition, the number of banks 22 defined for the NAND memory 20 is not limited to eight.

Figure 4:
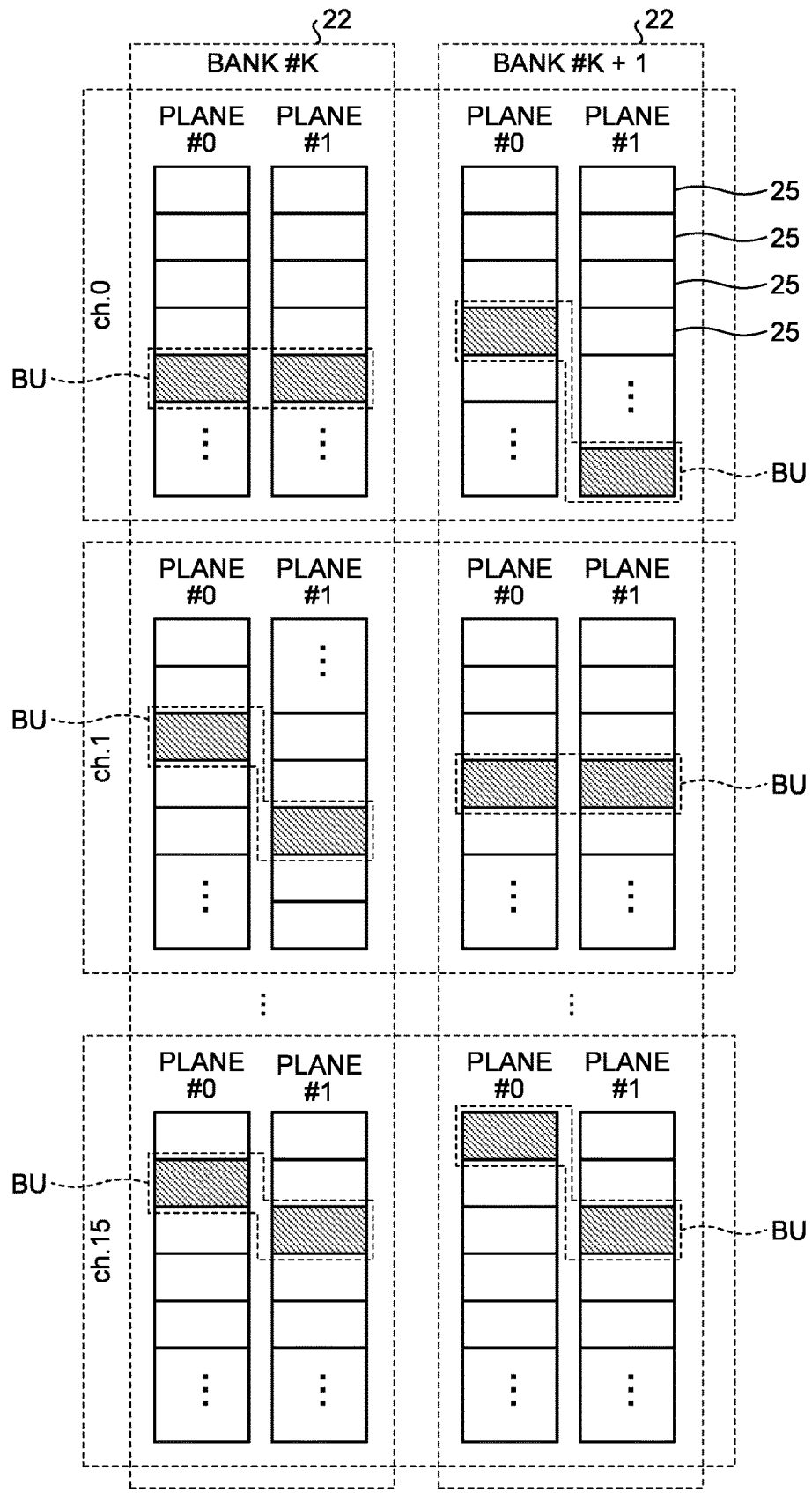
FIG. 4 is a schematic diagram for describing a method for creating a candidate configuration according to the embodiment.

FIG. 4 is a schematic diagram for describing a method for generating a candidate configuration according to the embodiment. The memory controller 10 selects one or more banks 22 from among the banks 22 (banks #0 to #7). The memory controller 10 then selects a plurality of parallel writing element from among the selected one or more banks 22.

In the example illustrated in FIG. 4, the memory controller 10 selects a bank #K and a bank #K+1. Here, K is an integer of zero to six. Note that, when two or more banks 22 are selected, the bank numbers of the selected banks 22 are not necessarily continuous as in this example. The memory controller 10 selects thirty-two (32) to sixty-four (64) parallel writing elements in total, each belonging to either one of the selected two banks, that is, the bank #K or the bank #K+1. The memory controller 10 selects sixty-four (64) physical blocks 25 in which at least one of the channel number of the connected channel ch, the bank number of the belonging bank 22, and the plane number of the area 24 included therein is different from each other. Each physical block 25 hatched with oblique lines illustrated in FIG. 4 is an example of the physical block 25 selected as the parallel writing element. The memory controller 10 recognizes a group including the selected sixty-four (64) physical blocks 25 as a candidate configuration.

Note that, in the embodiment, as an example, the memory controller 10 manages the physical blocks 25 included in the same memory chip 21 and the different area 24 as a single unit. This single unit is referred to as the block unit BU. In the embodiment, one memory chip 21 includes two areas 24. Therefore, in one memory chip 21, a pair of one physical block 25 included in the plane #0 and one physical block 25 included in the plane #1 is managed as one block unit BU.

Specifically, the memory controller 10 selects thirty-two (32) block units BU and sets, as a candidate configuration, a group of sixty-four (64) physical blocks 25 constituted by the selected thirty-two (32) block units BU.

Figure 5:
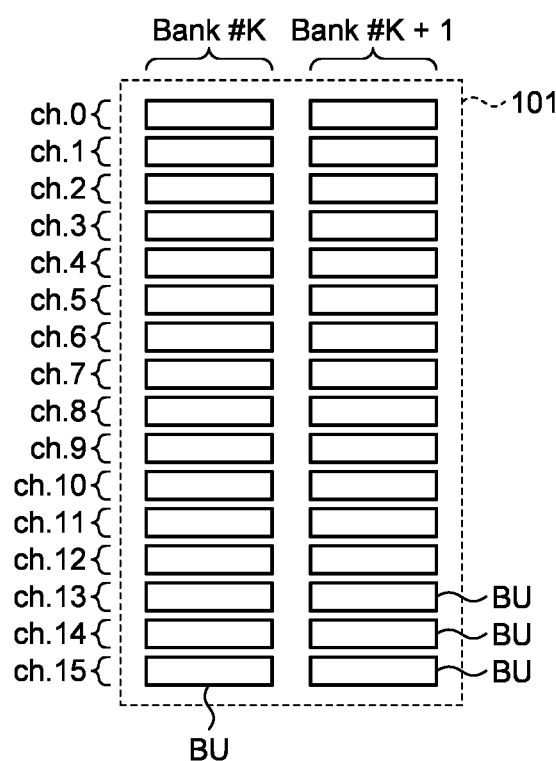
FIG. 5 is a schematic diagram illustrating one candidate configuration according to the embodiment.

FIG. 5 is a schematic diagram illustrating one candidate configuration according to the embodiment. As illustrated in the drawing, the memory controller 10 sets a group of 32 block units BU in total as one candidate configuration 101.

Note that one memory chip 21 includes a plurality of block units BU. The memory controller 10 generates the plurality of block units BU per one memory chip 21. The number of block units BU to be generated may be different for each memory chip 21. For example, when a defective block is included in the physical blocks 25 in one area 24 of a memory chip 21, the memory controller 10 generates the block unit BU by using the remaining physical blocks 25 except the defective block.

Here, in order to simplify the description, it is assumed that one area 24 includes N physical blocks 25, and M block units BU are generated per memory chip 21. Note that N is an integer of two or more. M is an integer of two or more and N or less.

For example, the memory controller 10 selects one of the M block units BU from each of the total of 32 memory chips 21 belonging to one of the bank #K and the bank #K+1. Then, the memory controller 10 sets the group of the selected thirty-two (32) block units BU as one candidate configuration 101.

Subsequently, the memory controller 10 newly selects one from the one or more block units BU, which have not yet been selected from the M block units BU, from among each of the total of 32 memory chips 21 belonging to one of the bank #K and the bank #K+1. Then, the memory controller 10 sets the group of the newly selected thirty-two (32) block units BU as another candidate configuration 101.

In this manner, the memory controller 10 sets the plurality of candidate configurations 101 out of a total of 32 memory chips 21 belonging to one of the bank #K and the bank #K+1. In short, the memory controller 10 sets the plurality of candidate configurations 101 illustrated in FIG. 5.

The block unit BU is an example of the first storage area. In addition, the candidate configuration 101 is an example of the first group that is a group of first storage areas selected from different memory chips 21 out of the memory chips 21 capable of parallel operation.

The memory controller 10 does not necessarily manage the plurality of physical blocks 25 as the block unit BU. The memory controller 10 may execute various types of management for each physical block 25. The various management includes managing code rates, managing defective blocks, managing candidate configurations 101 and super blocks (described in detail below) as the smallest components, and the like. That is, the physical block 25 may be the first storage area.

After generating the candidate configurations 101, the memory controller 10 removes one or more block units BU from each of the candidate configurations 101, and sets, as a super block, each candidate configuration 101 after the removal. Note that removing the block unit BU from the candidate configuration 101 means excluding the block unit BU from the candidate configuration 101. The block unit BU excluded from the candidate configuration 101 is eliminated from the candidate for the component of the super block. The number of block units BU removed from one candidate configuration 101 is a number obtained by subtracting the minimum number of block units BU necessary for storing the user data corresponding to the zone capacity from the number of block units BU included in one candidate configuration 101. Therefore, one super block includes the minimum number of block units BU necessary for storing the user data corresponding to the zone capacity. In other words, one super block includes the minimum number of block units BU capable of storing data from the host 2 at least up to the zone capacity.

In the super block, not only user data but also redundant data such as an error correction code is stored. Therefore, a storage area having a capacity exceeding the zone capacity is required to store the user data corresponding to the zone capacity. The memory controller 10 calculates the minimum number of block units BU for obtaining the total capacity obtained by adding the capacity necessary for storing the redundant data to the zone capacity. Then, the memory controller 10 obtains the number of block units BU to be removed by subtracting the minimum number of block units BU obtained by the calculation from the number of block units BU included in one candidate configuration 101.

Note that, when removing one or more block units BU from each of the candidate configurations 101, the memory controller 10 makes the number of block units BU to be removed be as uniform as possible among sixteen channels.

Figure 6A:
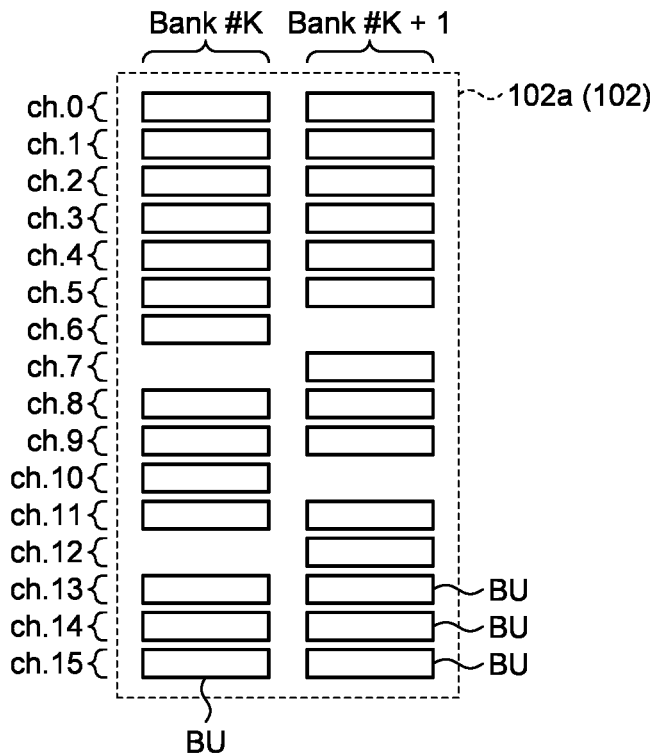
FIG. 6A is a schematic diagram illustrating an example of a super block generated by the memory controller according to the embodiment.
Figure 6B:
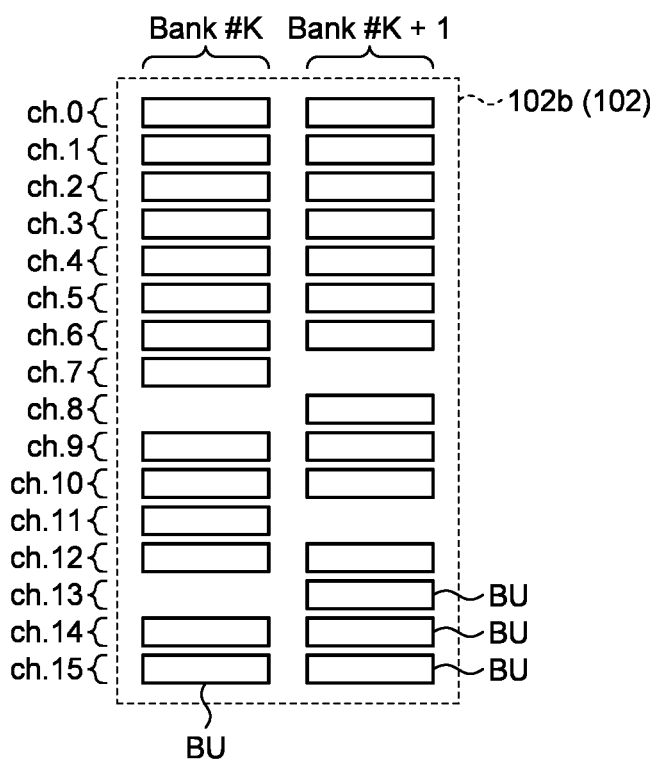
FIG. 6B is a schematic diagram illustrating an example of another super block generated by the memory controller according to the embodiment.
Figure 6C:
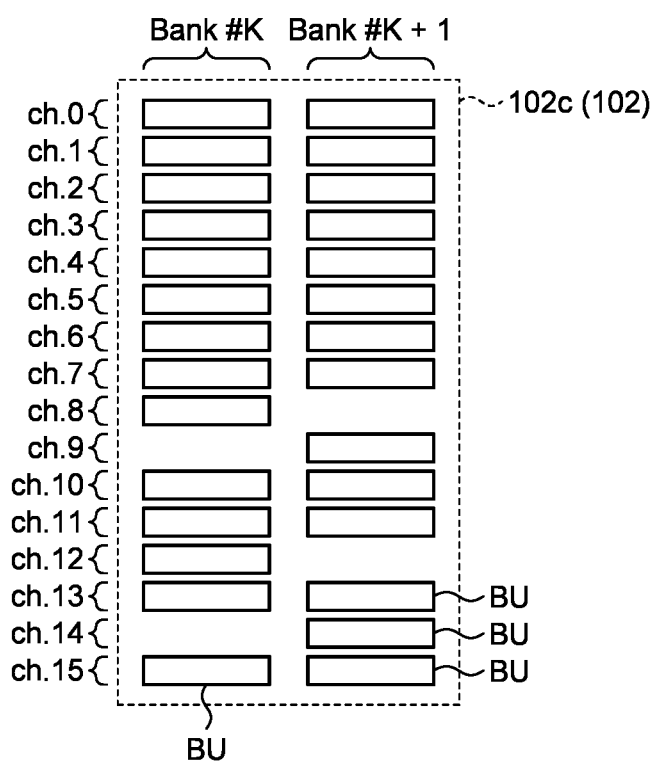
FIG. 6C is a schematic diagram illustrating an example of still another super block generated by the memory controller according to the embodiment.

FIGS. 6A to 6C are each a schematic diagram illustrating an example of a super block generated by the memory controller 10 according to the embodiment.

As illustrated in FIG. 6A, for example, the memory controller 10 removes, from a candidate configuration 101, the block unit BU selected from the memory chip 21 connected to the channel ch. 7 and the block unit BU selected from the memory chip 21 connected to the channel ch. 12 each out of the sixteen memory chips 21 belonging to the bank #K, and removes the block unit BU selected from the memory chip 21 connected to the channel ch. 6 and the block unit BU selected from the memory chip 21 connected to the channel ch. 10 each out of the sixteen memory chips 21 belonging to the bank #K+1. The memory controller 10 sets a group of the remaining twenty-eight (28) block units BU as a super block 102 (See a super block 102a in FIG. 6A).

In addition, as illustrated in FIG. 6B, the memory controller 10 removes, from another candidate configuration 101, the block unit BU selected from the memory chip 21 connected to the channel ch. 8 and the block unit BU selected from the memory chip 21 connected to the channel ch. 13 each out of the sixteen memory chips 21 belonging to the bank #K, and removes the block unit BU selected from the memory chip 21 connected to the channel ch. 7 and the block unit BU selected from the memory chip 21 connected to the channel ch. 11 each out of the sixteen memory chips 21 belonging to the bank #K+1. The memory controller 10 sets a group of the remaining twenty-eight (28) block units BU as a super block 102 (See a super block 102b in FIG. 6B).

In addition, as illustrated in FIG. 6C, the memory controller 10 removes, from still another candidate configuration 101, the block unit BU selected from the memory chip 21 connected to the channel ch. 9 and the block unit BU selected from the memory chip 21 connected to the channel ch. 14 each out of the sixteen memory chips 21 belonging to the bank #K, and removes the block unit BU selected from the memory chip 21 connected to the channel ch. 8 and the block unit BU selected from the memory chip 21 connected to the channel ch. 12 each out of the sixteen memory chips 21 belonging to the bank # K+1. The memory controller 10 sets a group of the remaining twenty-eight (28) block units BU as a super block 102 (See a super block 102c in FIG. 6C).

In this manner, the memory controller 10 varies (shifts, for example) the channel ch of the block unit BU to be removed for each candidate configuration 101, making the number of block units BU to be removed as uniform as possible among the sixteen channels ch. Note that the number of the block units BU to be removed for each channel ch may not be uniform among the sixteen channels ch.

Note that the super block 102 is an example of the second group.

When data is written to each super block 102, the memory controller 10 writes the data in parallel to the plurality of block units BU constituting the super block 102 of the writing destination. In addition, the memory controller 10 controls each memory chip 21 to write data in parallel to the two physical blocks 25 constituting each block unit BU.

Figure 7:
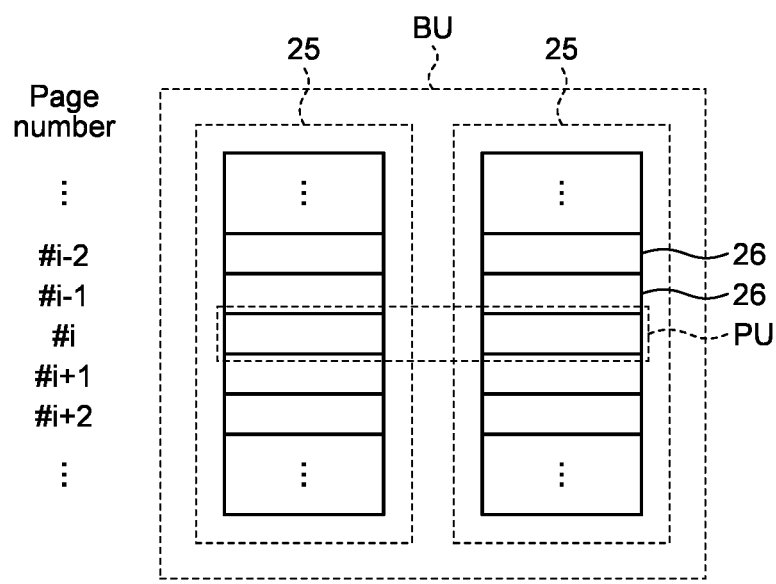
FIG. 7 is a schematic diagram for describing two physical pages written in parallel to a block unit according to the embodiment.

FIG. 7 is a schematic diagram for describing two physical pages 26 written in parallel to a block unit BU according to the embodiment. The memory chip 21 simultaneously writes data to the two physical pages 26 included in different physical blocks 25 constituting one block unit BU. A group including two physical pages 26 that are included in one block unit BU and to which data is simultaneously written is referred to as a page unit PU.

In the example illustrated in FIG. 7, one page unit PU includes two physical pages 26 to which the same page number is given and selected from different physical blocks 25.

For example, one page unit PU includes two physical pages 26 given with a page number called a page #i. Another page unit PU includes two physical pages 26 given with a page number called a page #i+1. Another one page unit PU includes two physical pages 26 given with a page number called a page #i+2. FIG. 7 illustrates, as an example, the page unit PU including two physical pages 26 to which a page number called the page # i is given.

Note that the page numbers of the physical pages 26 constituting one page unit PU may not be the same. One page unit PU may include the physical pages 26 to which different page numbers are given.

Figure 8:
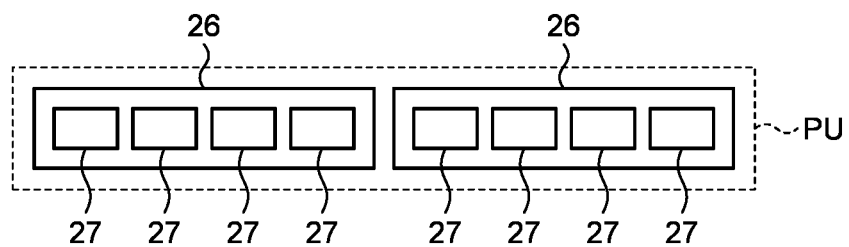
FIG. 8 is a schematic diagram for describing data written to a page unit according to the embodiment.

FIG. 8 is a schematic diagram for describing data written to the page unit PU according to the embodiment. The memory controller 10 manages data stored in the NAND memory 20 in units of clusters 27. The size of the clusters 27 is smaller than the size of the physical pages 26. The sizes of all the clusters 27 are common.

More specifically, the memory controller 10 manages a position where data is stored in the NAND memory 20 by using a physical address. As described above, when the user data is transferred from the host 2 to the memory system 1, the logical address is transferred in association with the user data. When writing the user data to the NAND memory 20, the memory controller 10 stores a physical address value indicating a position of the writing destination of the user data in the NAND memory 20 in association with a logical address value received in association with the user data. The cluster 27 is the smallest unit of data that may be specified by a physical address value. When reading data from the memory chip 21, the memory controller 10 can instruct the memory chip 21 on the position where the data to be read is stored with a physical address value in units of clusters 27.

In the example illustrated in FIG. 8, four clusters 27 are stored per one physical page 26. Therefore, eight clusters 27 are stored in one page unit PU.

Note that one page unit PU includes, in addition to the eight clusters 27, an area (not illustrated) in which an error correction code generated by encoding the code rate of the maximum value may be stored. That is, when the code rate is the maximum value, one page unit PU may store user data corresponding to the eight clusters 27 and an error correction code generated by encoding the code rate of the maximum value and used to correct errors of the user data corresponding to the eight clusters 27.

Figure 9A:
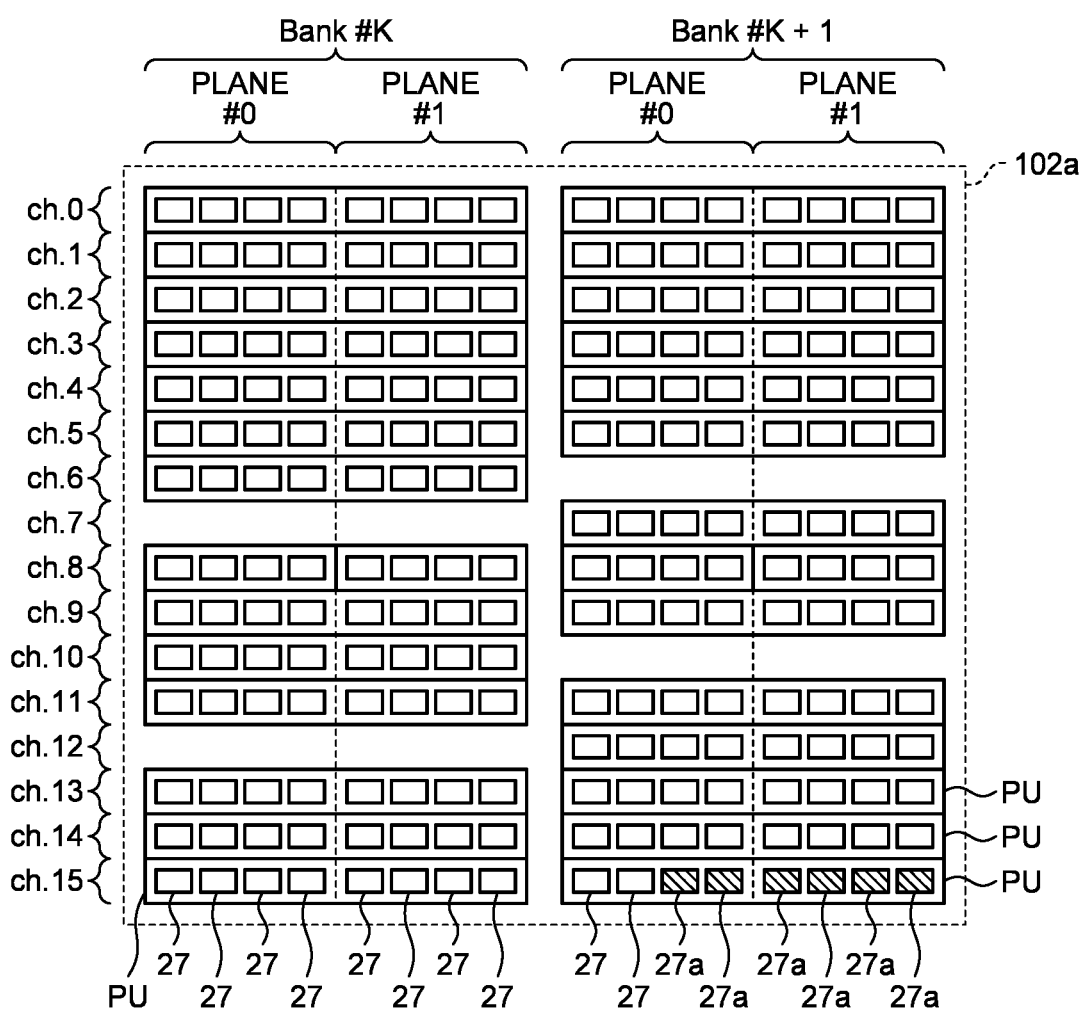
FIG. 9A is a schematic diagram illustrating a group of page units that may be written in parallel with respect to a super block at a first timing when user data is written for the first time after shipment of the memory system.

FIG. 9A is a schematic diagram illustrating a group of the page units PU that may be written in parallel with respect to the super block 102a at a first timing shortly after being used for the first time after shipment of the memory system 1. According to the example illustrated in the drawing, in the super block 102a, data may be written in parallel to twenty-eight (28) page units PU. In this manner, a group of page units PU that may be written in parallel to one super block 102 is referred to as a super page. The memory controller 10 executes parallel writing for each super page.

As described above, the super block 102 includes the minimum number of block units BU necessary for storing the user data corresponding to the zone capacity. However, the capacity in which the user data of each super block 102 can be stored is adjusted in units of block units BU, so that the amount of user data that can be stored into one super block 102 may slightly exceed the zone capacity. When the writing of the user data corresponding to the zone capacity is completed, in a case where there is an extra area where data is not written to the super block 102, the memory controller 10 executes padding, that is, writing of meaningless data to the extra area. As a result, data is written until there is no free area in all the block units BU constituting the super block 102.

In the example illustrated in FIG. 9A, each super page included in the super block 102a includes twenty-eight (28) page units PU, and one page unit PU can store user data corresponding to eight clusters 27. Therefore, each super page has a capacity capable of storing user data corresponding to 224 clusters 27.

On the other hand, the amount obtained by dividing the zone capacity by the number of super pages included in the super block 102a, that is, the amount obtained by converting the zone capacity into the capacity per super page corresponds to the capacity corresponding to 218 clusters 27.

In this case, the super block 102a has an extra area corresponding to six clusters 27 per one super page.

As described above, in a case where there is an extra area where data is not written to the super block 102 in a state where the writing of the user data corresponding to the zone capacity is completed, the memory controller 10 executes padding for writing meaningless data to the extra area. For example, in the example illustrated in FIG. 9A, the memory controller 10 writes meaningless data to six clusters 27a per super page.

Note that the area where meaningless data is written is not necessarily uniformly provided in each super page. The memory controller 10 may collect areas where meaningless data is written to an arbitrary super page.

The zone capacity is an example of the first amount. The capacity that the user data can be stored in one super block is an example of the second amount.

Note that the trigger for executing padding is not limited to the end of writing of the user data corresponding to the zone capacity in one super block 102. The memory controller 10 may perform padding when the writing of the user data to one zone is determined to be completed, even if the amount of user data written to the zone has not reached the zone capacity.

Hereinafter, the extra area means an area obtained by subtracting an area where the user data corresponding to the zone capacity is written from an area of one super block 102 where the user data can be stored.

Figure 9B:
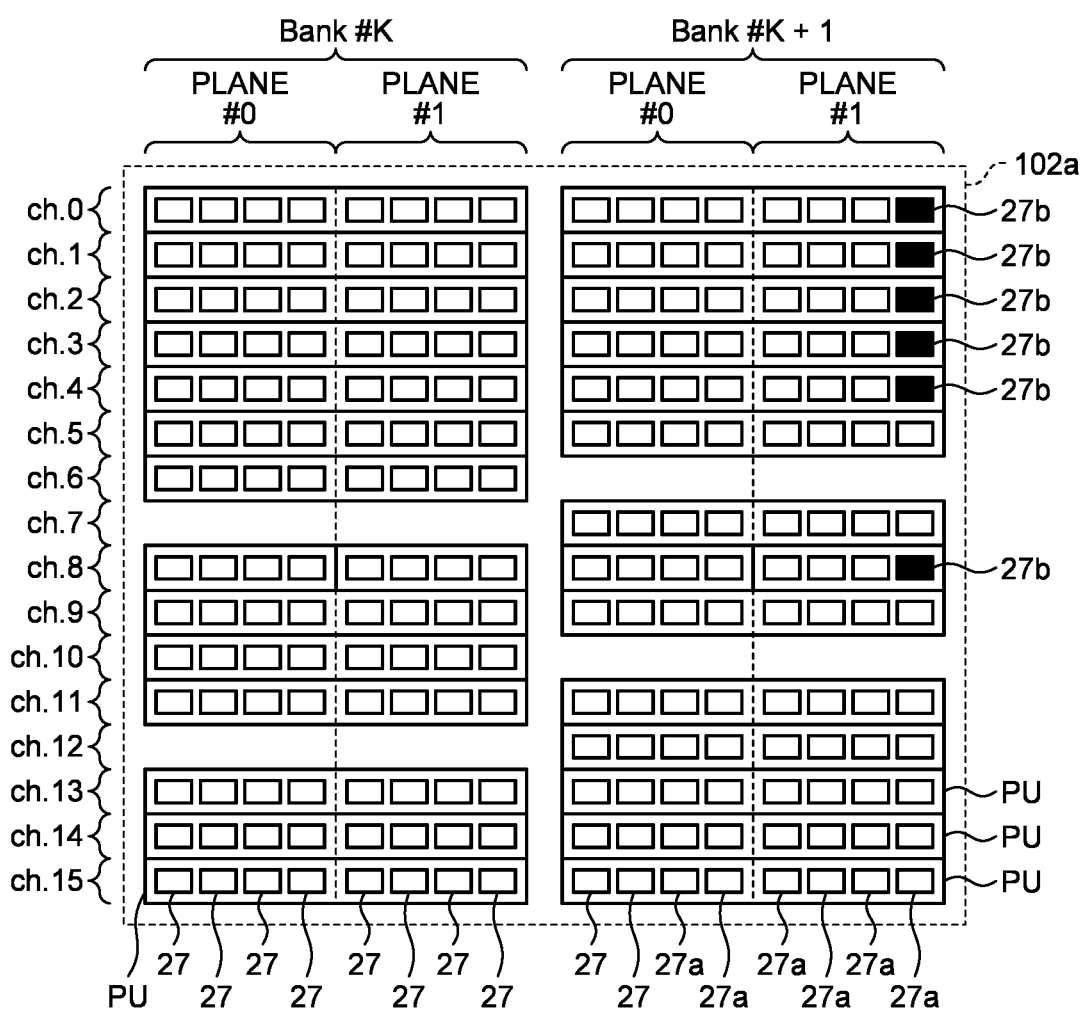
FIG. 9B is a schematic diagram for describing a state of each super page of a super block at a second timing when a writing/erasing cycle is executed several times after the first timing.

FIG. 9B is a schematic diagram for describing a state of each super page of the super block 102a at a second timing when a writing/erasing cycle is executed several times after the first timing. Since the writing/erasing cycle is executed several times for the super block 102a after the first timing, the reliability of data decreases in some block units BU. Then, the memory controller 10 reduces the code rate of the block unit BU in which the reliability of the data has decreased.

In the example illustrated in FIG. 9B, out of the fourteen block units BU belonging to the bank # K+1, the code rate is reduced by one step for each of the block unit BU selected from the memory chip 21 connected to the channel ch. 0, the block unit BU selected from the memory chip 21 connected to the channel ch. 1, the block unit BU selected from the memory chip 21 connected to the channel ch. 2, the block unit BU selected from the memory chip 21 connected to the channel ch. 3, the block unit BU selected from the memory chip 21 connected to the channel ch. 4, and the block unit BU selected from the memory chip 21 connected to the channel ch. 8. As a result, the capacity in which the user data can be stored is reduced by six clusters 27 per one super page. For example, illustrated six clusters 27b represent the clusters 27 in which user data cannot be stored due to a reduction of the code rate. For example, an error correction code for correcting an error of user data for which the code rate is reduced by one step may be stored in the six clusters 27b.

In the example illustrated in FIG. 9B, the capacity in which the user data can be stored is reduced by six clusters 27b per super page. As a result, the capacity in which the user data can be stored per super page is equal to the amount obtained by converting the zone capacity into the capacity per super page. That is, at the second timing, super block 102a does not have an extra area. In such a case, padding different from writing of user data corresponding to the zone capacity is unnecessary.

Figure 9C:
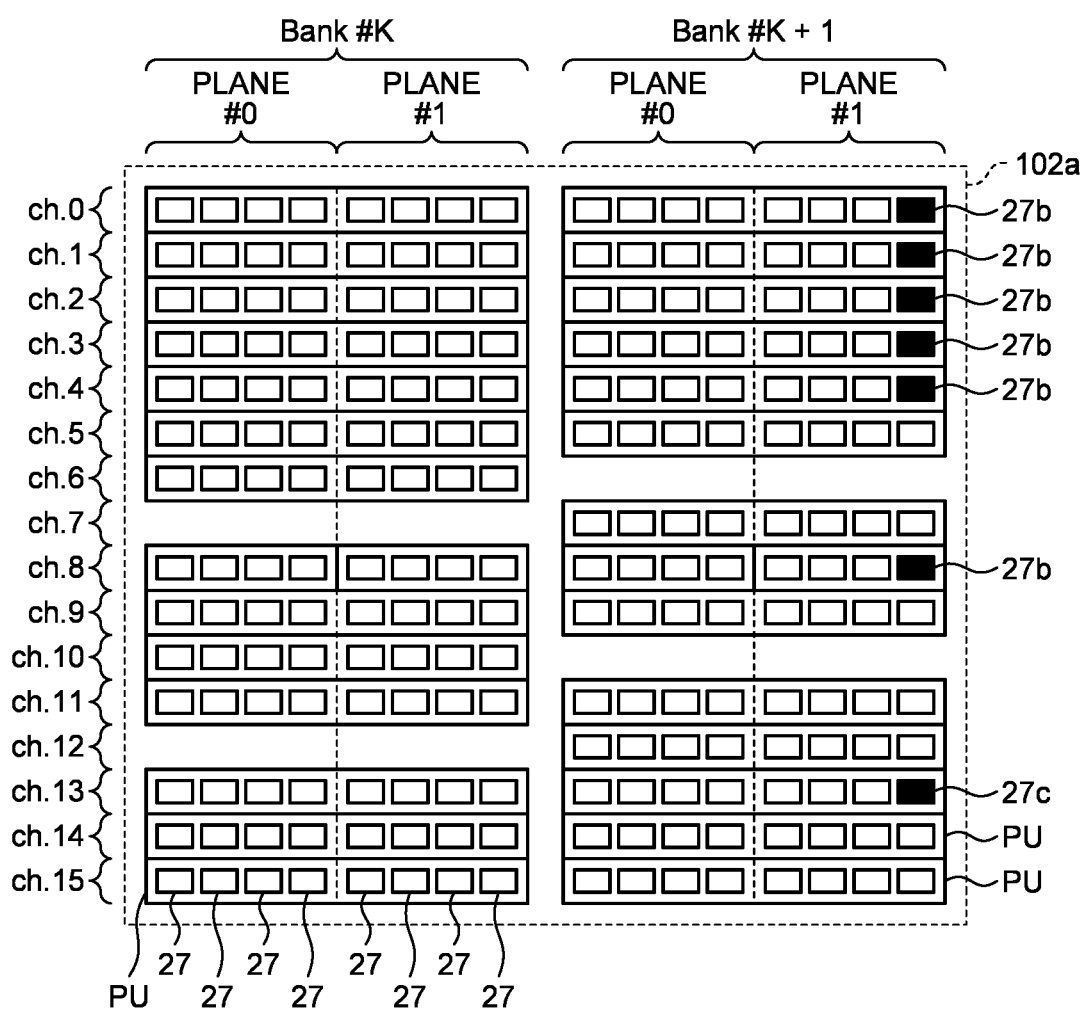
FIG. 9C is a schematic diagram for describing a state of each super page of a super block at a third timing when a writing/erasing cycle is further executed several times after the second timing.

FIG. 9C is a schematic diagram for describing a state of each super page of the super block 102a at a third timing when a writing/erasing cycle is further executed several times after the second timing.

In the example illustrated in FIG. 9C, the code rate is further reduced by one step from the second timing in the block unit BU selected from the memory chip 21 connected to the channel ch. 13. As a result, the amount of user data that can be stored into the super block 102a is insufficient from the zone capacity by one cluster 27 per super page. For example, illustrated one cluster 27c represent the cluster 27 in which user data cannot be stored due to a reduction of the code rate.

When the amount of user data that can be stored into the super block 102 falls below the zone capacity, the memory controller 10 compensates, with the block unit BU removed from the candidate configuration 101, the storage area for the shortage, that is, the storage area having the capacity obtained by subtracting from the zone capacity the amount of user data available for being stored in the super block 102.

Specifically, the memory controller 10 reserves all the block units BU removed from the candidate configurations 101. Then, when the capacity shortage occurs due to the reduction of the code rate or the occurrence of the defective block in a super block 102, the memory controller 10 adds one or more block units BU out of the reserved block units BU to the super block 102 in which the capacity shortage occurs.

Figure 9D:
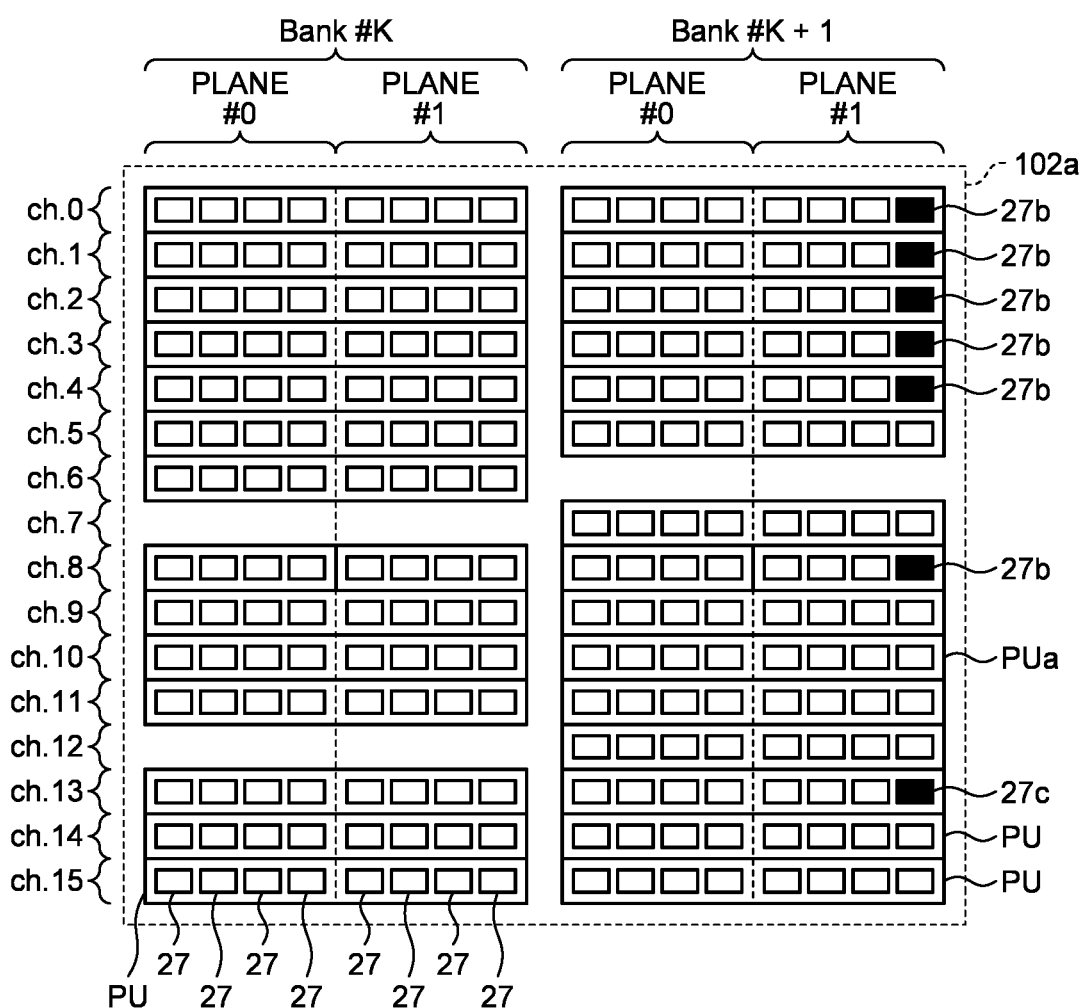
FIG. 9D is a schematic diagram for describing a state of each super page of a super block at a fourth timing when shortage is compensated after the third timing.

FIG. 9D is a schematic diagram for describing a state of each super page of the super block 102a at a fourth timing when shortage is compensated after the third timing.

In the example illustrated in FIG. 9D, one block unit BU selected from the memory chips 21 connected to the channel ch. 10 of the bank #K+1 is added to the super block 102a. As a result, a page unit PUa capable of storing user data corresponding to the eight clusters 27 is added to each super page included in the super block 102a. That is, in each super page, the shortage of one cluster 27 is compensated by the added eight clusters 27. Accordingly, the shortage of the capacity is resolved.

Note that the super block 102a illustrated in FIG. 9D includes an extra area corresponding to the amount of seven clusters 27 per super page. In the embodiment, when an extra area is generated by adding the block unit BU, the memory controller 10 is configured to be able to reduce the capacity of the extra area as much as possible by removing one or more block units BU from the super block 102.

Figure 9E:
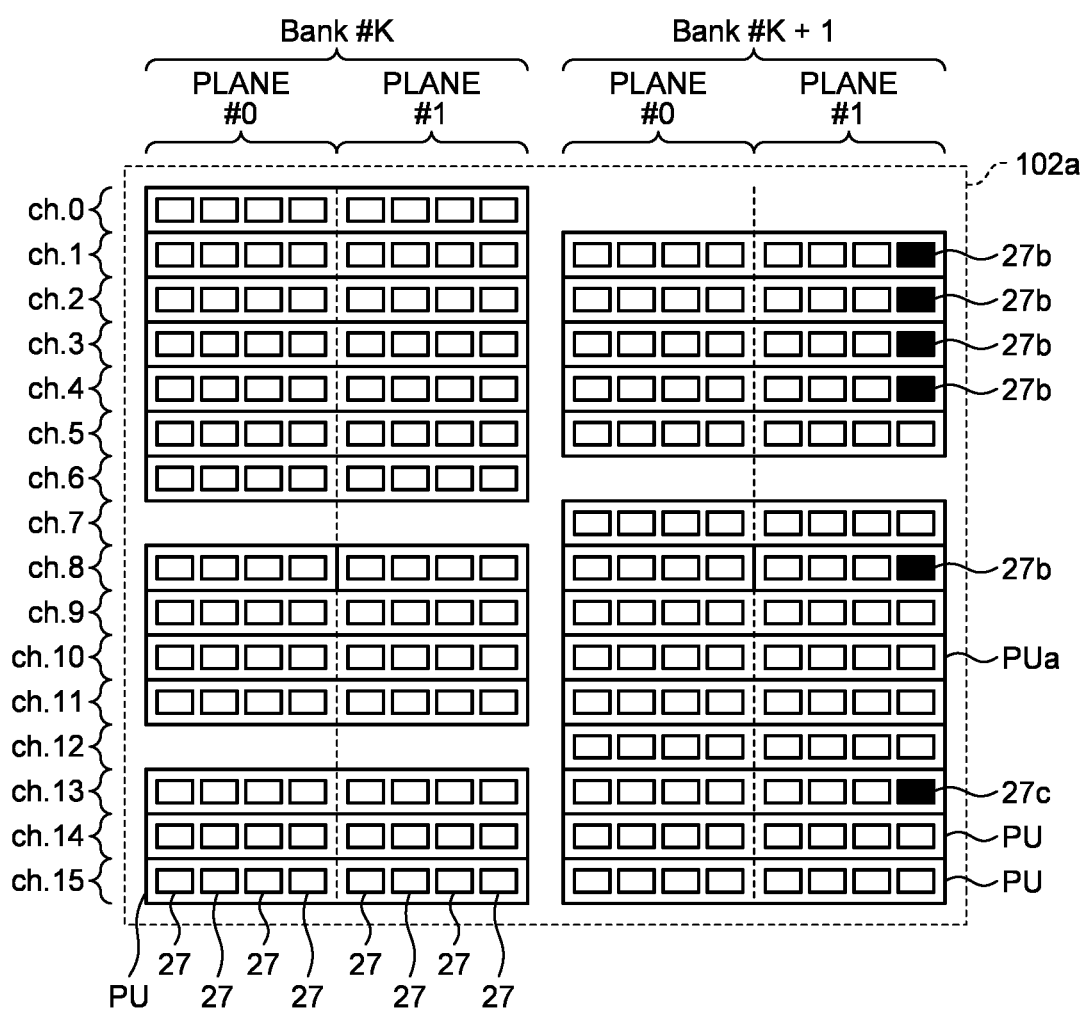
FIG. 9E is a schematic diagram for describing a state of each super page of a super block at a fifth timing when one block unit is removed after the fourth timing.

FIG. 9E is a schematic diagram for describing a state of each super page of the super block 102a at a fifth timing when one block unit BU is removed after the fourth timing.

In the example illustrated in FIG. 9E, the block unit BU selected from the memory chip 21 connected to the channel ch. 0 of the bank #K+1 is removed from the super block 102a in the state illustrated in FIG. 9D.

The super block 102a illustrated in FIG. 9D includes an extra area corresponding to the amount of seven clusters 27 per super page. Then, out of the block units BU constituting the super block 102a illustrated in FIG. 9D, the block unit BU included in the memory chip 21 connected to the channel ch. 0 of the bank #K+1 has a capacity capable of storing user data corresponding to seven clusters 27 per page unit PU. Then, the block unit BU having a capacity capable of storing user data corresponding to seven clusters 27 per one page unit PU is removed from the super block 102a including an extra area corresponding to the amount of seven clusters 27 per one super page. As a result, the capacity that can store the user data per super page is equal to the amount obtained by converting the zone capacity into the capacity per super page. That is, an extra area is eliminated from the super block 102a.

Note that the memory controller 10 reserves the block unit BU included in the memory chip 21 connected to the channel ch. 0 of the bank #K+1 removed from the super block 102a until the block unit BU is added to any one of the super block 102 again.

In the example described with reference to FIGS. 9A to 9E, the decrease in the capacity in which the user data can be stored in super block 102 is caused by the reduction of the code rate. The decrease in the capacity in which the user data can be stored in the super block 102 may also be caused by setting the block unit BU included in the super block 102 as a defective block. When the shortage of the capacity in the super block 102 is caused by setting the block unit BU as the defective block, the memory controller 10 compensates the shortage from the block unit BU reserved in advance similarly to the case where the shortage of the capacity occurs in the super block 102 due to the reduction of the code rate.

In this manner, the memory controller 10 configures each super block 102 with the minimum number of block units BU that can obtain the zone capacity. Then, when the capacity shortage occurs in a super block 102 due to the reduction of the code rate or the occurrence of the defective block, the memory controller 10 adds the block unit BU reserved in advance to the super block 102. As a result, an extra area of each super block 102 can be reduced as much as possible.

Note that, in the example described with reference to FIGS. 9A to 9E, one block unit BU is added to the super-block 102, or one block unit BU is removed from the super block 102. The number of block units BU added to the super block 102 at one time may be two or more. The number of block units BU removed from the super block 102 at one time may be two or more. For example, the memory controller 10 may resolve the shortage and minimize the extra capacity by adding three block units BU to the super block 102 and removing two block units BU from the super block 102.

In the example described with reference to FIGS. 9A to 9E, one block unit BU is added to the super block 102, and then another one block unit BU is removed from the super block 102. The order of execution of addition of the block unit BU and removal of the block unit BU is not limited to this example.

Here, a technique to be compared with the present embodiment will be described. The technique to be compared with the embodiment is referred to as a comparative example. According to the comparative example, a memory controller generates super blocks each having a uniform size. Then, after the operation of the memory system is started, the memory controller does not add a physical block to one super block or remove a physical block from one super block. Therefore, in order to make it possible to store user data corresponding to at least the zone capacity even if the code rate is reduced or a defective block occurs in a certain super block, the memory controller causes each super block to have a large amount of extra area in advance when generating each super block.

As described above, when there is an extra area in one superblock in a state where writing of user data corresponding to the zone capacity to the super block is completed, padding is performed. In the comparative example, since a large amount of extra capacity is provided in each super block, the amount of meaningless data written by padding is very large. Therefore, according to the comparative example, the write amplification factor (hereinafter, WAF) is poor, and the period during which the memory system operates with enough reliability decreases. In addition, since the hardware resources of the NAND memory (for example, the bandwidth of the channel connecting the NAND memory and the memory controller) are occupied by the writing of meaningless data, the writing speed of the user data decreases. That is, according to the comparative example, the performance of the memory system is deteriorated.

On the other hand, according to the embodiment, the extra area included in each super block 102 can be reduced as much as possible. Therefore, deterioration of the WAF due to padding is suppressed. Accordingly, as compared with the comparative example, a period during which the memory system 1 operates with enough reliability can be made long, and a decrease in the speed of writing the user data is suppressed. That is, the memory controller 10 according to the embodiment can generate the super block to have higher performance than the comparative example.

Figures 10, 11:
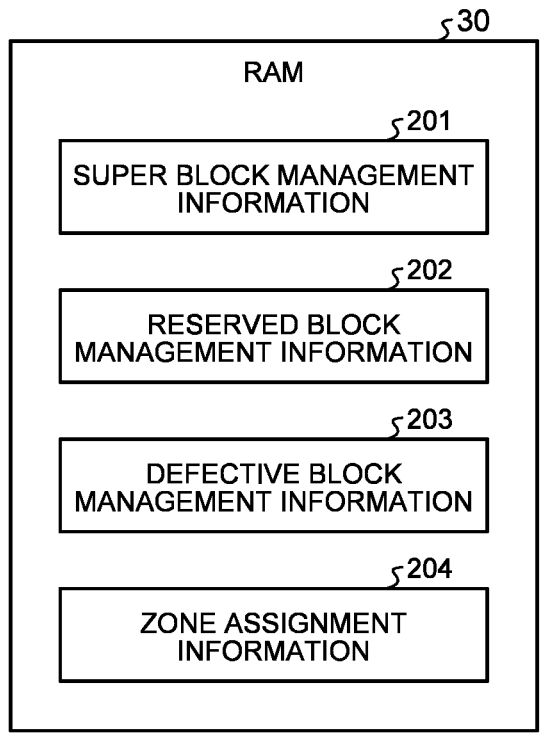
FIG. 10 is a schematic diagram for describing an example of management information stored in RAM according to the embodiment.
FIG. 11 is a schematic diagram illustrating an example of a data structure of reserved block management information according to an embodiment.

The CPU 11 stores various types of management information for realizing the above-described operation into, for example, the RAM 30. FIG. 10 is a schematic diagram for describing an example of management information stored in the RAM 30 according to the embodiment. As illustrated in FIG. 10, the RAM 30 stores super block management information 201, reserved block management information 202, defective block management information 203, and zone assignment information 204.

The super block management information 201 is information in which identification information of a plurality of block units BU constituting the super block 102 is recorded for each super block 102. When setting a super block 102, the CPU 11 records identification information of the super block 102 and the identification information of a plurality of block units BU constituting the super block 102 in association with each other. In addition, when a block unit BU is removed from a super block 102, or when a block unit BU is added to a super block 102, the CPU 11 updates the super block management information 201 according to removal or addition of the block unit BU.

The zone assignment information 204 is information that associates identification information of a zone with the identification information of the super block 102 assigned to the zone.

The defective block management information 203 is a list of identification information of block units BU prohibited from being used. For example, when the code rate of a block unit BU is reduced to the lower limit value and the reliability of data cannot be secured even at the code rate of the lower limit value, the CPU 11 registers the identification information of the block unit BU on the defective block management information 203. As a result, the block unit BU is set as a defective block. The CPU 11 does not use the block unit BU registered on the defective block management information 203.

The reserved block management information 202 is information in which identification information of the block unit BU that can be added to the super block 102 is recorded.

FIG. 11 is a schematic diagram illustrating an example of a data structure of the reserved block management information 202 according to an embodiment. As illustrated in the drawing, the reserved block management information 202 includes three sub-lists for each pair of channel and bank (in other words, for each memory chip 21). The three sub-lists are a first BU list, a second BU list, and a third BU list.

The first BU list is a list of identification information of the block unit BU in which the code rate is set to the upper limit value. The block unit BU registered on the first BU list can store user data corresponding to eight clusters 27 per one page unit PU.

The second BU list is a list of identification information of the block unit BU in which the code rate is reduced by one step from the upper limit value. The block unit BU registered on the second BU list can store user data corresponding to seven clusters 27 per one page unit PU.

The third BU list is a list of identification information of the block unit BU in which the code rate is reduced by two steps from the upper limit value. The block unit BU registered on the third BU list can store user data corresponding to six clusters 27 per page unit PU.

Note that it is assumed that a value obtained by reducing the code rate by two steps from the upper limit value is the lower limit value. The lower limit value of the code rate is not limited to this example.

As described above, the block unit BU that can be added to the super block 102 is classified and managed by each of the channel, the bank, and the set code rate.

The memory controller 10 can add the block unit BU managed by the reserved block management information 202 to the super block 102. In the example described with reference to FIGS. 9A to 9E, in the memory controller 10, the block unit BU managed by the first BU list and in which the code rate is set to the upper limit value is added to the super block 102. The memory controller 10 can add, to the super block 102, the block unit BU managed by the second BU list and in which the code rate is reduced by one step from the upper limit value. In addition, the memory controller 10 can add, to the super block 102, the block unit BU managed by the third BU list and in which the code rate is reduced by two steps from the upper limit value.

Next, an operation of the memory system 1 according to the embodiment will be described.

Figure 12:
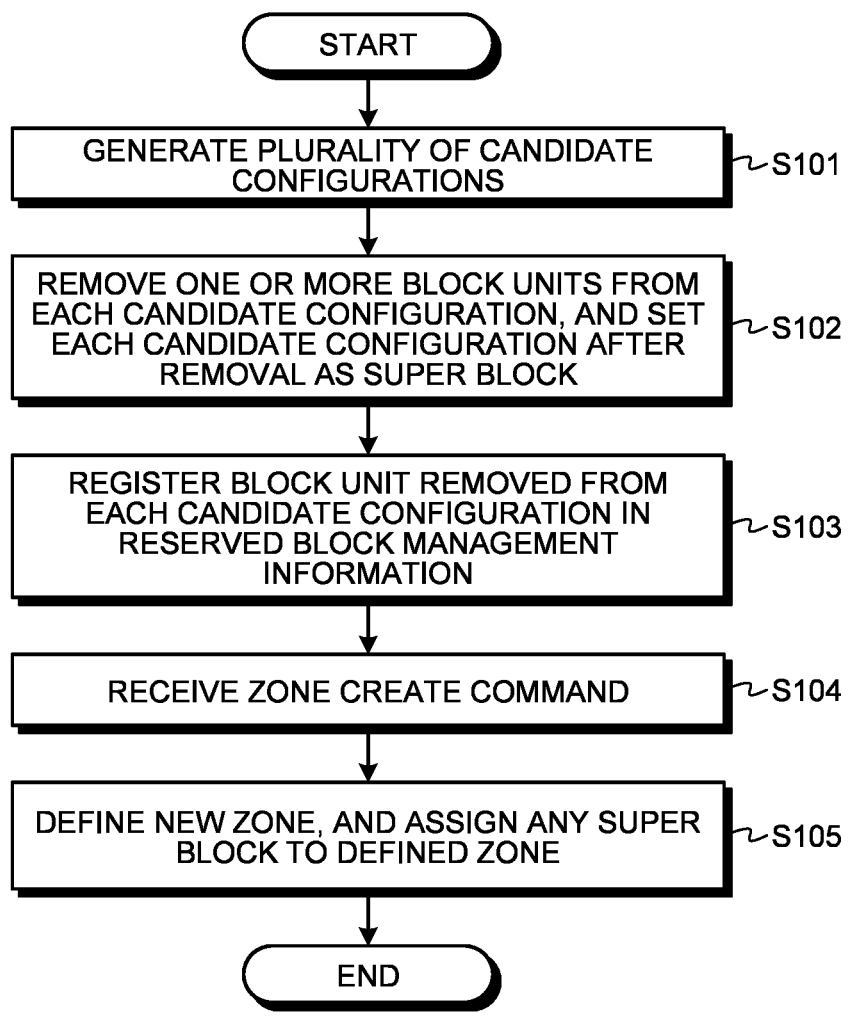
FIG. 12 is a flowchart for describing an example of operation of the memory system according to the embodiment related to generation of the super block.

FIG. 12 is a flowchart for describing an example of operation of the memory system 1 according to the embodiment related to generation of the super block 102.

First, the memory controller 10 generates candidate configurations 101 (S101). The memory controller 10 selects one block unit BU from each of the memory chips 21 capable of parallel operation, and sets a group of the block units BU selected from different memory chips 21 as one candidate configuration 101.

For example, the memory controller 10 selects one or more banks from among the banks #0 to #7 as described above with reference to FIGS. 4 and 5. Then, the memory controller 10 selects parallel writing elements from among the selected one or more banks. Then, the memory controller 10 sets a group including the selected parallel writing elements as one candidate configuration 101.

Subsequent to S101, the memory controller 10 removes one or more block units BU from each candidate configuration 101 and sets, as the super block 102, each candidate configuration 101 after the removal (S102). In S102, the memory controller 10 adds information about each super block 102 to the super block management information 201.

The memory controller 10 registers the block unit BU removed in S102 on the reserved block management information 202 (S103).

When the memory system 1 receives a zone create command from the host 2 (S104), the memory controller 10 defines a new zone and assigns any super block 102 to the defined new zone (S105). In S105, the memory controller 10 records information about the newly defined zone in the zone assignment information 204.

Then, a series of operations related to setting of the super block 102 is completed.

FIG. 13 is a flowchart for describing an example of an operation of writing to the super block 102 of the memory system 1 according to the embodiment. Here, a series of operations that the memory system 1 according to the embodiment starts in response to a request for writing to a zone from the host 2 will be described.

First, the memory controller 10 refers to the zone assignment information 204 to specify the super block 102 assigned to the writing destination zone (S201). The specified super block 102 is referred to as a target super block 102.

Subsequently, the memory controller 10 determines the occurrence of a defective block (S202).

In S202, the memory controller 10 determines whether or not each block unit BU constituting the target super block 102 can be continuously used. When there is a block unit BU in which the code rate is set to the lower limit value and the reliability of the stored data does not satisfy the criterion, the memory controller 10 determines that the block unit BU has become a defective block. In addition, when there is a failed block unit BU, the memory controller 10 determines that the block unit BU has become a defective block.

When any block unit BU constituting the target super block 102 becomes a defective block, the memory controller 10 removes the block unit BU from the target super block 102 and registers the block unit BU on the defective block management information 203. When none of the block units BU constituting the target super block 102 is a defective block, the memory controller 10 does not change the configuration of the target super block 102.

Subsequently, the memory controller 10 determines whether to reduce the code rate (S203).

In S204, the memory controller 10 determines whether or not to reduce the code rate for each block unit BU constituting the target super block 102. When there is a block unit BU determined to reduce the code rate, the memory controller 10 reduces the code rate for the block unit BU.

Subsequently, the memory controller 10 determines whether or not the amount of user data that can be stored into the target super block 102 is less than the zone capacity (S204). In response to determining that the amount of user data that can be stored into the target super block 102 is less than the zone capacity (S204: Yes), the memory controller 10 determines whether or not the capacity obtained by subtracting the amount of user data that can be stored into the target super block 102 from the insufficient capacity, that is, the zone capacity, can be compensated (S205). The memory controller 10 refers to the reserved block management information 202 and determines whether or not the insufficient capacity can be compensated on the basis of whether or not there is the block unit BU that can be used to compensate for the insufficient capacity.

In response to determining that the insufficient capacity cannot be compensated (S205: No), the memory controller 10 disassembles the target super block 102 (S206).

In S206, the memory controller 10 registers all the block units BU constituting the target super block 102 on the reserved block management information 202. In addition, the memory controller 10 removes the information about the target super block 102 from the super block management information 201.

Subsequent to S206, the memory controller 10 assigns another super block 102 to the writing destination zone (S207). By the process of S207, the super block 102 assigned to the writing destination zone, that is, the target super block 102 is switched to the new super block 102.

After S207, the control proceeds to S202, and the memory controller 10 determines the occurrence of a defective block for the new super block 102 as the target super block 102.

In response to determining that the shortage of the capacity can be compensated (S205: Yes), the memory controller 10 compensates the shortage of the capacity by using one or more block units BU registered on the reserved block management information 202 (S208).

In S208, the memory controller 10 can add one or more block units BU to the target super block 102 or remove one or more block units BU from the target super block 102 in a manner that the capacity of the extra area is reduced as much as possible. The memory controller 10 can select the block unit BU to be added from the block units BU on the first BU list, the second BU list, and the third BU list. When the block unit BU is added to the target super block 102 or the block unit BU is removed from the target super block 102, the memory controller 10 updates the super block management information 201. When the block unit BU is removed from the target super block 102, the memory controller 10 registers the block unit BU on the reserved block management information 202.

After S208 or when the amount of user data that can be stored into the target super block 102 is equal to or larger than the zone capacity (S204: No), the memory controller 10 erases data for the target superblock 102 (S209).

In S209, the memory controller 10 collectively erases data for all the block units BU constituting the target super block 102. As a result, the target super block 102 can write data.

After S209, the memory controller 10 writes data to the target super block 102 (S210).

In S210, the memory controller 10 writes the user data corresponding to the zone capacity received from the host 2 to the super block 102 assigned to the writing destination zone. The memory controller 10 writes the user data corresponding to the zone capacity received from the host 2 to the target super block 102 together with redundant data such as an error correction code.

After writing the user data corresponding to the zone capacity together with the redundant data to the target super block 102, the memory controller 10 determines whether or not an extra area exists in the target super block 102 (S211). In response to determining that there is an extra area in the target super block 102 (S211: Yes), the memory controller 10 executes padding for writing meaningless data to the extra area (S212). Then, the operation of writing to the super block 102 is completed.

In response to determining that there is no extra area in the target super block 102 (S211: No), the memory controller 10 skips the processing of S213, and the operation of writing to the super block 102 is completed.

As described above, according to the embodiment, the memory controller 10 generates the plurality of candidate configurations 101 that is a group of block units BU selected from different memory chips 21 out of the memory chips 21 capable of parallel operation. Then, the memory controller 10 removes one or more block units BU from each of the candidate configurations 101 to generate the super blocks 102 each including a minimum number of block units BU and capable of storing user data up to at least a zone capacity. The memory controller 10 executes data writing until there is no free area in all the block units BU constituting one super block 102. In addition, the memory controller 10 collectively erases data for all the block units BU constituting one super block 102.

Therefore, deterioration of the WAF due to padding is suppressed compared with the comparative example. Accordingly, as compared with the comparative example, a period during which the memory system 1 operates with enough reliability can be made long, and a decrease in the speed of writing the user data is suppressed. That is, the memory controller 10 of the embodiment can generate the super block 102 to have higher performance than the comparative example.

In addition, according to the embodiment, when the capacity of one super block 102 capable of storing the user data becomes smaller than the zone capacity due to the reduction of the code rate, the memory controller 10 adds, to the super block 102, at least one of the block units BU removed from the candidate configurations 101.

Therefore, the error correction capability can be enhanced in accordance with the decrease in the reliability of the data stored in the NAND memory 20 while maintaining the storable capacity of each super block 102 for the user data at the zone capacity or more, In addition, according to the embodiment, when the capacity of one super block 102 capable of storing the user data becomes smaller than the zone capacity due to the occurrence of a defective block, the memory controller 10 adds at least one of the block units BU removed from the candidate configurations 101 to the super block 102.

Therefore, even when a defective block occurs, the storable capacity of each super block 102 for the user data can be maintained equal to or larger than the zone capacity.

In addition, according to the embodiment, when the capacity of the super block 102 in which the user data can be stored is larger than the zone capacity by adding the block unit BU to one super block 102, the extra capacity of the super block 102 is reduced by removing the block unit BU in which the code rate is reduced from the super block 102.

Therefore, it is possible to constantly suppress deterioration of the WAF due to padding during the operation of the memory system 1.

Note that, in the above description, the memory system 1 is an SSD of a type referred to as a ZNS SSD. The technology according to the embodiment can be applied to other than the ZNS SSD. For example, the technology according to the embodiment can also be applied to an SSD of a stream specification.

While some embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system connectable to a host, the memory system comprising:
  a plurality of memory chips operable in parallel, each memory chip of the plurality of memory chips including a plurality of first storage areas;
  a memory controller configured to:
    generate a plurality of first groups, each first group of the plurality of first groups including first storage areas selected from different memory chips among the plurality of memory chips,
    generate a plurality of second groups, each second group of the plurality of the second group being constituted by a minimum number of first storage areas composed by excluding one or more first storage areas from each first group of the plurality of first groups, the minimum number of first storage areas being capable of storing at least a first amount of data received from the host, and
    execute writing of the data to all the minimum number of first storage areas constituting one second group; and
  a circuit configured to execute error correction including encoding data written to each second group by an encoding system whose code rate is variable, and decoding data read from each second group,
  wherein the memory controller is configured to:
    reduce a code rate of data written to a first second group of the plurality of second groups, and
    add at least one of second storage areas to the first second group when a second amount becomes smaller than the first amount due to reduction of the code rate, the second storage areas each being the first storage area excluded from any first group of the plurality of first groups, the second amount indicating a storage capacity of the first second group capable of storing data received from the host.

2. The memory system according to claim 1, wherein the memory controller is further configured to:
 individually execute reduction of the code rate for each first storage area, and,
 when the second amount becomes larger than the first amount due to the addition of the at least one of second storage areas, reduce a third amount obtained by subtracting the first amount from the second amount by removing a third storage area from the second group, the third storage area being an area on which the reduction of the code rate has been executed out of all the minimum number of first storage areas constituting the first second group.

3. The memory system according to claim 2, wherein the memory controller is configured to execute padding to an extra area available for writing data when the extra area remains in the second group after writing data of the first amount to one second group.

4. The memory system according to claim 1, wherein the memory controller is configured to:
 set, to be unusable, one or more first storage areas included in a second second group of the plurality of second groups, and,
 when the second amount becomes smaller than the first amount due to the setting of the one or more first storage areas to be unusable, add at least one of second storage areas to the second second group.

5. The memory system according to claim 1, wherein the memory controller is configured to execute padding to an extra area available for writing data when the extra area remains in the second group after writing data of the first amount to one second group.

6. The memory system according to claim 1, wherein
 the memory system is a zoned namespace (ZNS) solid state drive (SSD),
 the memory controller is configured to assign one second group of the plurality of second groups to one zone, and
 the first amount is a total amount of data that the host is allowed to write to the one zone.

7. A method of controlling a memory system including a plurality of memory chips operable in parallel, each memory chip of the plurality of memory chips including a plurality of first storage areas, the method comprising:
 generating a plurality of first groups, each first group of the plurality of first groups including first storage areas selected from different memory chips among the plurality of memory chips;
 generating a plurality of second groups, each second group of the plurality of the second group being constituted by a minimum number of first storage areas composed by excluding one or more first storage areas from each first group of the plurality of first groups, the minimum number of first storage areas being capable of storing at least a first amount of data received from the host;
 executing writing of the data to all the minimum number of first storage areas constituting one second group;
 setting, to be unusable, one or more first storage areas included in a first second group of the plurality of second groups; and,
 based on a second amount becoming smaller than the first amount due to the setting of the one or more first storage areas to be unusable, adding at least one of second storage areas to the first second group, the second storage areas each being the first storage area excluded from any first group of the plurality of first groups, the second amount indicating a storage capacity of the first second group capable of storing data received from the host.

8. The method according to claim 7, further comprising:
 executing error correction including encoding data written to each second group by an encoding system whose code rate is variable, and decoding data read from each second group;
 reducing a code rate of data written to a second second group of the plurality of second groups; and
 adding at least one of the second storage areas to the second second group based on the second amount becoming smaller than the first amount due to reduction of the code rate.

9. The method according to claim 8, further comprising:
 individually executing reduction of the code rate for each first storage area; and,
 based on the second amount becoming larger than the first amount due to the addition of the at least one of second storage areas, reducing a third amount obtained by subtracting the first amount from the second amount by removing a third storage area from the second group, the third storage area being an area on which the reduction of the code rate has been executed out of all the minimum number of first storage areas constituting the second first second group.

10. The method according to claim 8, further comprising executing padding to an extra area available for writing data based on the extra area remaining in the second group after writing data of the first amount to one second group.

11. The method according to claim 7, further comprising:
 executing error correction including encoding data written to each second group by an encoding system whose code rate is variable, and decoding data read from each second group,
 individually executing reduction of the code rate for each first storage area, and,
 based on the second amount becoming larger than the first amount due to the addition of the at least one of second storage areas, reducing a third amount obtained by subtracting the first amount from the second amount by removing a third storage area from the second group, the third storage area being an area on which the reduction of the code rate has been executed out of all the minimum number of first storage areas constituting the first second group.

12. The method according to claim 7, further comprising executing padding to an extra area available for writing data based on the extra area remaining in the second group after writing data of the first amount to one second group.

13. The method according to claim 7, wherein
 the memory system is a zoned namespace (ZNS) solid state drive (SSD),
 the method further comprises assigning one second group of the plurality of second groups to one zone, and wherein
 the first amount is a total amount of data that the host is allowed to write to the one zone.

14. A memory system connectable to a host, the memory system comprising:
 a plurality of memory chips operable in parallel, each memory chip of the plurality of memory chips including a plurality of first storage areas; and
 a memory controller configured to:
  generate a plurality of first groups, each first group of the plurality of first groups including first storage areas selected from different memory chips among the plurality of memory chips, generate a plurality of second groups, each second group of the plurality of the second group being constituted by a minimum number of first storage areas composed by excluding one or more first storage areas from each first group of the plurality of first groups, the minimum number of first storage areas being capable of storing at least a first amount of data received from the host, execute writing of the data to all the minimum number of first storage areas constituting one second group, set, to be unusable, one or more first storage areas included in a first second group of the plurality of second groups, and, when a second amount becomes smaller than the first amount due to the setting of the one or more first storage areas to be unusable, add at least one of second storage areas to the first second group, the second storage areas each being the first storage area excluded from any first group of the plurality of first groups, the second amount indicating a storage capacity of the first second group capable of storing data received from the host.

15. The memory system according to claim 14, further comprising a circuit configured to execute error correction including encoding data written to each second group by an encoding system whose code rate is variable, and decoding data read from each second group, wherein the memory controller is configured to:
reduce a code rate of data written to a second second group of the plurality of second groups, and
add at least one of second storage areas to the second second group when the second amount becomes smaller than the first amount due to reduction of the code rate.

16. The memory system according to claim 15, wherein the memory controller is further configured to:
individually execute reduction of the code rate for each first storage area, and,
when the second amount becomes larger than the first amount due to the addition of the at least one of second storage areas, reduce a third amount obtained by subtracting the first amount from the second amount by removing a third storage area from the second group, the third storage area being an area on which the reduction of the code rate has been executed out of all the minimum number of first storage areas constituting the second second group.

17. The memory system according to claim 15, wherein the memory controller is configured to execute padding to an extra area available for writing data when the extra area remains in the second group after writing data of the first amount to one second group.

18. The memory system according to claim 14, further comprising a circuit configured to execute error correction including encoding data written to each second group by an encoding system whose code rate is variable, and decoding data read from each second group, wherein the memory controller is further configured to:
individually execute reduction of the code rate for each first storage area, and,
when the second amount becomes larger than the first amount due to the addition of the at least one of second storage areas, reduce a third amount obtained by subtracting the first amount from the second amount by removing a third storage area from the second group, the third storage area being an area on which the reduction of the code rate has been executed out of all the minimum number of first storage areas constituting the first second group.

19. The memory system according to claim 14, wherein the memory controller is configured to execute padding to an extra area available for writing data when the extra area remains in the second group after writing data of the first amount to one second group.

20. The memory system according to claim 14, wherein
the memory system is a zoned namespace (ZNS) solid state drive (SSD),
the memory controller is configured to assign one second group of the plurality of second groups to one zone, and
the first amount is a total amount of data that the host is allowed to write to the one zone.

* * * * *